Patented Nov. 14, 1922.

1,435,359

UNITED STATES PATENT OFFICE.

JOHN C. WICHMANN, OF LOS ANGELES, CALIFORNIA.

PROCESS OF MAKING A RUBBERLIKE MATERIAL.

No Drawing.  Application filed April 23, 1921. Serial No. 463,860.

*To all whom it may concern:*

Be it known that I, JOHN C. WICHMANN, a citizen of the United States, residing at Los Angeles, in the county of Los Angeles and State of California, have invented new and useful Improvements in Processes of Making a Rubberlike Material, of which the following is a specification.

My invention relates to a process of making a rubber-like material and it is an object of this invention to treat the Yucca plant in a manner to form a product which in its physical characteristics is similar to the Pará rubber of commerce.

In my U. S. patent application for a process of making rubber-like material, dated May 24, 1921, No. 1,379,150, I have described a process of making a rubber-like material from the Yucca plant in which the Yucca plant is macerated and heated in a closed vessel with live steam of forty to fifty pounds pressure for about half an hour. The gummy and resinous juice is extracted from the cooked pulp and is treated with various catalyzers and reagents to produce the rubber-like material.

I have discovered that the resinous matter present in the Yucca juice is detrimental to the final rubber-like product, and the present invention has for its object to treat the Yucca juice so as to eliminate the resinous substance, leaving the gummy matter, which is afterwards treated to produce the rubber-like product.

My invention consists in the steps of the process hereinafter described and claimed.

The Yucca plant, inclusive of the roots, but discarding the leaves, is cut into pieces five to six inches long, and placed in a closed retort and heated. The heat should be applied gently at first in order to expel any air present and thus to prevent an explosion. The heat is gradually raised to 525° to 550° F. and all the volatile matter is expelled, leaving a carbonaceous black mass in the retort. The vapors and gases are conducted from the retort to a condenser and the distillate is drawn off and re-distilled at a temperature of 256° F., which will expel all the matter volatile at this temperature, inclusive of the resinous substances, leaving only the gummy material behind, which is of the color and consistency of brown molasses. The residual gummy substances obtained as just described are placed in a retort and the following re-agents are added thereto, calculated for fifty pounds of gummy material:

10 lbs. powdered sulfur.
5 lbs. powdered pumice stone.
5 lbs. powdered magnesium oxide.
20 lbs. asphaltum.
5 lbs. Pará gum dissolved in turpentine.
2 lbs. boiled linseed oil.
2½ lbs. carbon bisulfide.
½ lb. zinc oxide.

The mixture is heated at a temperature of 255 to 260° F. for one hour. The mixture becomes molten in about fifteen minutes and is agitated during the heating process by suitable mechanism, and is then poured into flat bottom pans and allowed to oxidize and harden. The temperature of the mass in the pans is kept preferably from 150° F. to 180° F., until the composition has solidified. The resulting rubber-like product resembles Pará gum in its physical characteristics and may be used as such, or blended therewith.

The sulfur acts as a vulcanizing agent and the asphaltum as a binder, the Pará gum as a catalyzer, and none of them can be dispensed with in the process of making the rubber-like product, but are essential. The powdered pumice stone and magnesium oxide serve to give body to the final product, and while they are not absolutely necessary I prefer to use them. Either one may be dispensed with or diminished in quantity, provided the other is increased by a corresponding amount. The boiled linseed oil and the zinc oxide serve as catalyzers, and the carbon bisulfide acts as a solvent of the mixture and is finally eliminated by evaporation. The linseed oil and zinc oxide are not absolutely necessary, although I prefer to use them for the reason that they facilitate the carrying on of the process and assist in the production of a superior final product.

Various changes in the steps of the process and in the proportions of the ingredients may be made by those skilled in the art without departing from the spirit of my invention as claimed.

I claim:

1. A process of making a rubber-like substance, comprising heating the fleshy parts of the Yucca plant in a closed chamber to distil the volatile matter, condensing the distilled volatile matter, heating the condensed volatile matter to a temperature sufficient to distil off the resinous substances but leaving the gummy material behind, adding sulfur, asphaltum and Pará gum in solution to the gummy material, heating the mixture to melt the ingredients and form a homogeneous mass, and drying and oxidizing the resulting mass.

2. A process of making a rubber-like substance, comprising heating the fleshy parts of the Yucca plant in a closed chamber to distil the volatile matter, condensing the distilled volatile matter, heating the condensed volatile matter to a temperature sufficient to distil off the resinous substances but leaving the gummy material behind, adding sulfur, pumice stone, magnesium oxide, asphaltum and Pará gum in solution to the gummy material, heating the mixture to melt the ingredients and form a homogeneous mass, and drying and oxidizing the resulting mass.

3. A process of making a rubber-like substance, comprising heating the fleshy parts of the Yucca plant in a closed chamber to distil the volatile matter, condensing the distilled volatile matter, heating the condensed volatile matter to a temperature sufficient to distil off the resinous substances but leaving the gummy material behind, adding sulfur, pumice stone, magnesium oxide, boiled linseed oil, zinc oxide, asphaltum and Pará gum in solution to the gummy material, heating the mixture to melt the ingredients and form a homogeneous mass, and drying and oxidizing the resulting mass.

4. A process of making a rubber-like substance, comprising heating the fleshy parts of the Yucca plant in a closed chamber to distil the volatile matter, condensing the distilled volatile matter, heating the condensed volatile matter to a temperature sufficient to distil off the resinous substances but leaving the gummy material behind, adding sulfur, pumice stone, magnesium oxide, boiled linseed oil, zinc oxide, carbon bisulfide, asphaltum and Pará gum in solution to the gummy material, heating the mixture to melt the ingredients and form a homogeneous mass, and drying and oxidizing the resulting mass.

5. A process of making a rubber-like substance as set forth in claim 1, limiting the temperature at which the resinous substances are distilled off to 256° F.

6. A process of making a rubber-like substance as set forth in claim 5, limiting the temperature at which the mixture is molten and made homogeneous to 255° to 260° F.

7. A process of making a rubber-like substance, comprising heating the fleshy parts of the Yucca plant in a closed chamber to distil the volatile matter therefrom, condensing the volatile matter, heating the volatile matter to a temperature of 256° F. to distil the resinous substances, but leaving the gummy substances behind, adding the following reagents, calculated for fifty pounds of gummy material: 10 pounds powdered sulfur, 5 pounds powdered pumice stone, 5 pounds powdered magnesium oxide, 20 pounds asphaltum, 5 pounds Pará gum dissolved in turpentine, 2 pounds boiled linseed oil, 2½ pounds carbon bisulfide and ½ pound zinc oxide, heating the resulting mixture to a temperature of 260° F. and drying and oxidizing the resulting product.

In testimony whereof I have signed my name to this specification.

JOHN C. WICHMANN.